April 4, 1967

J. JACUBENTA 3,312,401

MAGNETIC HOLDER FOR COOLANT AND OTHER
FLUID SUPPLY CONDUITS

Filed Sept. 9, 1965

INVENTOR.

JOHN JACUBENTA

BY *Isler & Ornstein*

ATTORNEYS

United States Patent Office 3,312,401
Patented Apr. 4, 1967

3,312,401
MAGNETIC HOLDER FOR COOLANT AND
OTHER FLUID SUPPLY CONDUITS
John Jacubenta, 7849 McCreery Road,
Cleveland, Ohio 44131
Filed Sept. 9, 1965, Ser. No. 486,059
7 Claims. (Cl. 239—283)

This invention relates, as indicated, to a magnetic holder for coolant and other fluid supply conduits, but has referred more particularly to a holder of this character which is especially adapted to supplying an oil coolant to work on machine tools.

It has heretofore been customary to supply an oil coolant to the work on a machine tool by means of either metallic tubing which requires bending to bring its outlet end to proper position with respect to the work, or by means of flexible tubing of a type which has to be secured to the machine tool by means of bolts or clamping brackets in order to maintain the outlet end of the tubing in proper relation to the work.

In servicing tools or setting up the machines, both types of tubing require a great deal of time, the metallic tubing requiring bending, and the flexible tubing requiring unbolting or unclamping of the tubing. In some cases, the coolant lines have to be removed, in their entirety, from the machine tool. Moreover, the handling and moving of the coolant lines produces bending or kinking thereof, and these bends in due course, restrict the flow of the coolant, requiring replacement of the lines.

The present invention has, as its primary object, the provision of a magnetic holder for coolant and other fluid supply lines which is especially adapted for use in conjunction with flexible plastic conduits, of a type which does not require bolting or clamping to the machine tool, and which does not require bending in order to properly position the conduit with respect to the work.

Another object of the invention is to provide a magnetic holder of the character described which embodies a nozzle which is not only adjustable to any desired position with respect to the work to be cooled, but which is also especially adapted for removable attachment to flexible plastic conduits of the type described.

A further object of the invention is to provide a magnetic holder of the character described which can be quickly and easily removed from one position on the machine tool and attached to the machine tool at any other desired position.

A still further object of the invention is to provide a magnetic holder of the character described which consists of a minimum number of parts which can be easily manufactured and assembled at low cost, and is eminently suited or adapted for the purposes for which it has been designed.

Other objects and advantages of my invention will be apparent during the course of the following description.

In the accompanying drawing forming a part of this specification, and which like numerals are employed to designate like parts throughout the same, FIG. 1 is a side elevational view of a magnetic holder embodying the invention;

Figure 1:
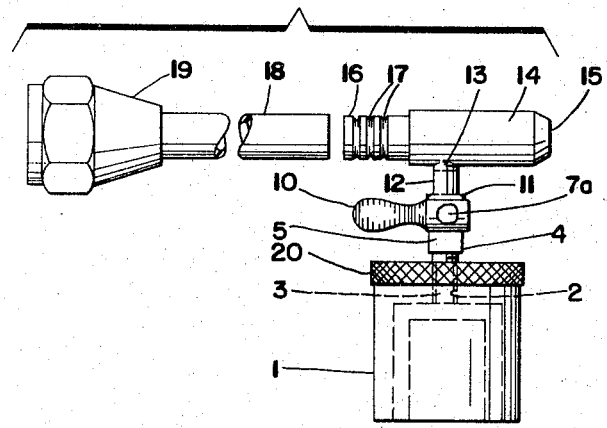

Referring more particularly to the drawings, the holder will be seen to comprise a magnet assembly 1, which is preferably an Alnico permanent magnet assembly of the insulated holding type, as described on page 26 of the Magnet Manual of Bunting Magnetics Company, of Chicago, Ill., such assembly having a tapped or threaded axial hole 2 in its upper end. For the purposes of the present invention, the magnet 1 preferably has a holding force or power of from about 20 to about 36 pounds, and is insulated to prevent accumulation of metal chips on the magnet.

Threadedly secured in the hole 2 of the magnet is the threaded stem 3 of a support element consisting of a base 4 from which the stem 3 extends, and a pair of upstanding transversely spaced bearing arms 5 and 6.

The arms 5 and 6 form a support for a screw 7, the head 8 of which bears against a washer 9 which, in turn bears against the outboard face of the arm 6.

Threadedly secured to the other end of the screw 7 is a handle or lever 10, which serves a purpose to be presently described. The end of the screw 7 is peened, as at 7a, to prevent removal or accidental displacement of the handle 10 from the screw.

Mounted on the screw 7, between the arms 5 and 6 of the support element, is a nozzle holder 11, which is pivotally movable about the screw 7, and is provided with an upstanding post 12 having an upper end 13 which is threaded into the bottom of a nozzle 14.

The nozzle 14 has an outlet end or tip 15, and a rear end 16 of reduced diameter having spaced annular serrations 17.

The reduced end 16 of the nozzle 14 is designed particularly for the frictional securement thereto of one end of a coolant supply tubing 18.

The tubing 18 is preferably a clear plastic tubing, such, for example, as Tygon R-4000, which has been found, especially advantageous for the purpose of this invention, due to its great flexibility and resilience and ability to resist permanent deformation or bending, and also for the reason that it is extremely resistant to hardening or deterioration, when used for conveying different coolant oils, both hot and cold. Such tubing may also be flared at its rear end for connection with an S.A.E. fitting of a machine tool, such as indicated by reference character 19 in FIG. 1.

The holder further includes a knurled lock nut 20, which is threadedly secured to the stem 3 of the support element, between the top of the magnet 1 and the base 4 of the support element.

All of the metallic parts, which have been described, with the exception of the washer 9 and lock nut 20, are preferably made of brass, due to easy machinability of brass, but other metals, and in some cases, plastics, may be employed for these parts.

The holder, as thus described, is used by merely attaching the magnet 1 to any desired point on the machine tool, the magnet being readily attracted to the machine tool, by reason of the fact that virtually all parts of the machine tool are made of steel or other ferrous metal.

Figure 2:
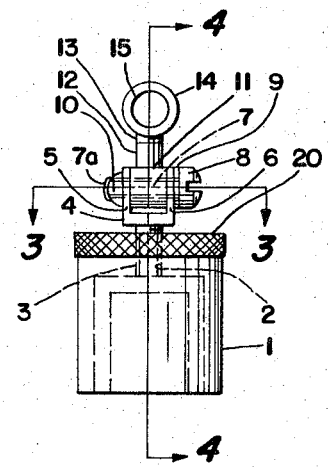
FIG. 2 is a front elevational view of the magnetic holder of FIG. 1.
Figure 3:
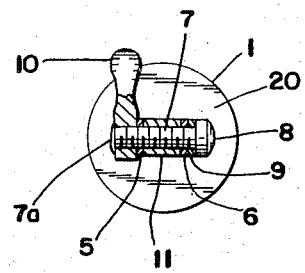
FIG. 3 is a fragmentary cross-sectional view, taken on the line 3—3 of FIG. 2.
Figure 4:
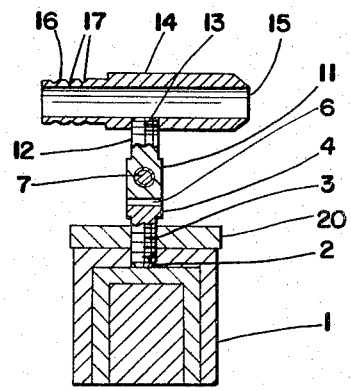
FIG. 4 is a fragmentary cross-sectional view, taken on the line 4—4 of FIG. 2.

As shown in FIGS. 1 and 2, the nozzle 14 is held in a pre-selected position or angle with respect to the axis of the magnet 1 by the frictional engagement of the handle or lever 10 with the outboard surface of the arm 5, which draws the head 8 of the screw 7 up sufficiently so that the nozzle holder 11 is held frictionally between the arms 5 and 6, and cannot rotate about the screw 7.

The position or angle of the nozzle 14 with respect to the axis of the magnet 1 may be changed by a slight movement of the handle 10 in a counterclockwise direction from the position shown in FIG. 1, which releases the holder 11 sufficiently to permit it to be moved about the screw 7 to any desired angle, after which the handle 10 is restored to its original position, as shown in FIG. 1, to maintain the holder 11 in its adjusted position.

The nozzle 14 may be swung to any desired position circumferentially about the axis of the magnet 1 by removing the magnet from the machine tool, and moving the nozzle to such position. This may also be accomplished without removing the magnet from the machine tool, by loosening the lock nut 20 sufficiently to bring it out of frictional engagement with the upper end of the magnet, and turning the stem 3 of the nozzle support element in the tapped hole 2 to bring the nozzle 14 to the desired position, after which the nut 20 is screwed down into frictional locking engagement with the upper end of the magnet to prevent further turning of the stem 3 of the nozzle support element in the hole 2.

It is thus seen that I have provided a magnetic holder for coolant and other fluid supply lines which is especially adapted for use in conjunction with flexible plastic conduits of a type which does not require bolting or clamping to the machine tool, and which does not require bending in order to properly position the conduit with respect to the work.

It is also seen that I have provided a magnetic holder which embodies a nozzle which is adjustable to any desired position with respect to the work to be cooled, but which is also especially adapted for removable attachment to flexible plastic conduits of the type described.

It is further seen that I have provided a magnetic holder of the character described which can be quickly and easily removed from one position on the machine tool and attached to the machine tool at any other desired location; which consists of a minimum number of parts which can be easily manufactured and assembled at low cost, and which is eminently suited or adapted for the purposes for which it has been designed.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In combination, a permanent magnet having a central threaded aperture in its upper end, a support element having a depending stem threadedly secured in said aperture, a nozzle holder supported for pivotal movement relatively to said support element, and a nozzle extending transversely of said nozzle holder and supported by said holder.

2. The combination, as recited in claim 1, wherein a screw is supported by said support element, and said nozzle holder is mounted on and is pivotally movable about said screw.

3. The combination, as recited in claim 2, including means for frictionally locking said nozzle holder against pivotal movement, said means comprising a handle threadedly secured to said screw and movable into frictional engagement with said support element.

4. The combination, as recited in claim 3, including a lock nut threadedly secured to said threaded stem and movable against the upper end of said magnet to lock the support element against rotation relatively to said magnet.

5. The combination, as recited in claim 4, wherein said nozzle is of one piece construction and has a rear portion of reduced diameter having axially-spaced annular serrations adapted for the frictional and removable securement thereto of a fluid supply conduit.

6. In combination, a permanent magnet having a central threaded aperture in its upper end; a support element consisting of a base, a depending threaded stem threadedly secured in said aperture, and a pair of upstanding transversely-spaced arms; a screw extending through and supported by said arms and having a head disposed at the outboard side of one of said arms, a handle threadedly secured to said screw at the outboard side of the other arm, a nozzle holder supported by said screw and pivotally movable about said screw, said holder having an upstanding threaded post, a nozzle secured to said post and extending transversely of said post, said handle being rotatable about said screw whereby to draw the head of the screw and the handle toward said arms to lock said nozzle holder against pivotal movement.

7. The combination, as recited in claim 6, including a lock nut threadedly secured to said stem and movable against the upper end of the magnet to lock the support element against rotation relatively to said magnet.

References Cited by the Examiner

UNITED STATES PATENTS 2,711,927  6/1955  Miller.
2,888,617  5/1959  Baumet _____ 335—302 X BERNARD A. GILHEANY, *Primary Examiner.*

G. HARRIS, *Assistant Examiner.*